(12) United States Patent
Morrow, Sr.

(10) Patent No.: US 10,327,596 B2
(45) Date of Patent: Jun. 25, 2019

(54) TURKEY LEG HOLDER

(71) Applicant: Kennedy Lorenzo Morrow, Sr., Missouri City, TX (US)

(72) Inventor: Kennedy Lorenzo Morrow, Sr., Missouri City, TX (US)

( * ) Notice: Subject to any disclaimer, the term of this patent is extended or adjusted under 35 U.S.C. 154(b) by 462 days.

(21) Appl. No.: 15/084,134

(22) Filed: Mar. 29, 2016

(65) Prior Publication Data

US 2016/0287023 A1 Oct. 6, 2016

Related U.S. Application Data

(60) Provisional application No. 62/141,468, filed on Apr. 1, 2015.

(51) Int. Cl.
*A47J 47/02* (2006.01)
*B65D 25/10* (2006.01)
*B65D 85/00* (2006.01)

(52) U.S. Cl.
CPC .............. *A47J 47/02* (2013.01); *B65D 25/10* (2013.01); *B65D 85/54* (2013.01)

(58) Field of Classification Search
CPC .......... A47F 3/005; A47J 47/02; B65D 25/10; B65D 25/101; B65D 81/02; B65D 85/00; B65D 85/54
USPC ............ 206/457, 583, 775, 822; 220/729, 8, 220/495.03, 915.1; 223/116; 229/117, 229/117.18, 902; 248/154, 176.1–2; 426/165, 138, 143–44, 232–33, 390
See application file for complete search history.

(56) References Cited

U.S. PATENT DOCUMENTS

| | | | |
|---|---|---|---|
| 2,928,537 A * | 3/1960 | Stagner | B65D 25/106 206/493 |
| 3,365,308 A | 1/1968 | Janicke | |
| 3,934,723 A | 1/1976 | Walker | |
| 4,301,762 A | 11/1981 | Burnett | |
| 5,669,505 A | 9/1997 | Mayer | |
| 5,810,306 A * | 9/1998 | Hung | B25J 1/02 248/160 |
| 5,868,249 A | 2/1999 | Ehnert | |
| 6,199,804 B1 * | 3/2001 | Donofrio, Jr. | A47F 7/0028 248/121 |
| 7,806,787 B1 * | 10/2010 | Gamboa | A63B 69/00 473/438 |
| 2004/0041423 A1 * | 3/2004 | Cannon | B25B 9/00 294/100 |
| 2007/0099476 A1 * | 5/2007 | Gaidosch | H01R 4/2458 439/395 |
| 2011/0170281 A1 * | 7/2011 | Shih | B25B 9/00 362/119 |

* cited by examiner

*Primary Examiner* — Anthony D Stashick
*Assistant Examiner* — Kaushikkumar A Desai
(74) *Attorney, Agent, or Firm* — Plager Schack LLP

(57) ABSTRACT

Some embodiments of the present disclosure include a turkey leg holder for storing a smoked turkey leg. The turkey leg holder may include an openable container having an interior configured to accommodate a turkey leg, the container having an upper panel attached to a lower panel; a pair of supports configured to secure the turkey leg within the container; and a rotation device attached to the supports, the rotation device providing for rotation of the supports and the turkey leg within the container.

7 Claims, 5 Drawing Sheets

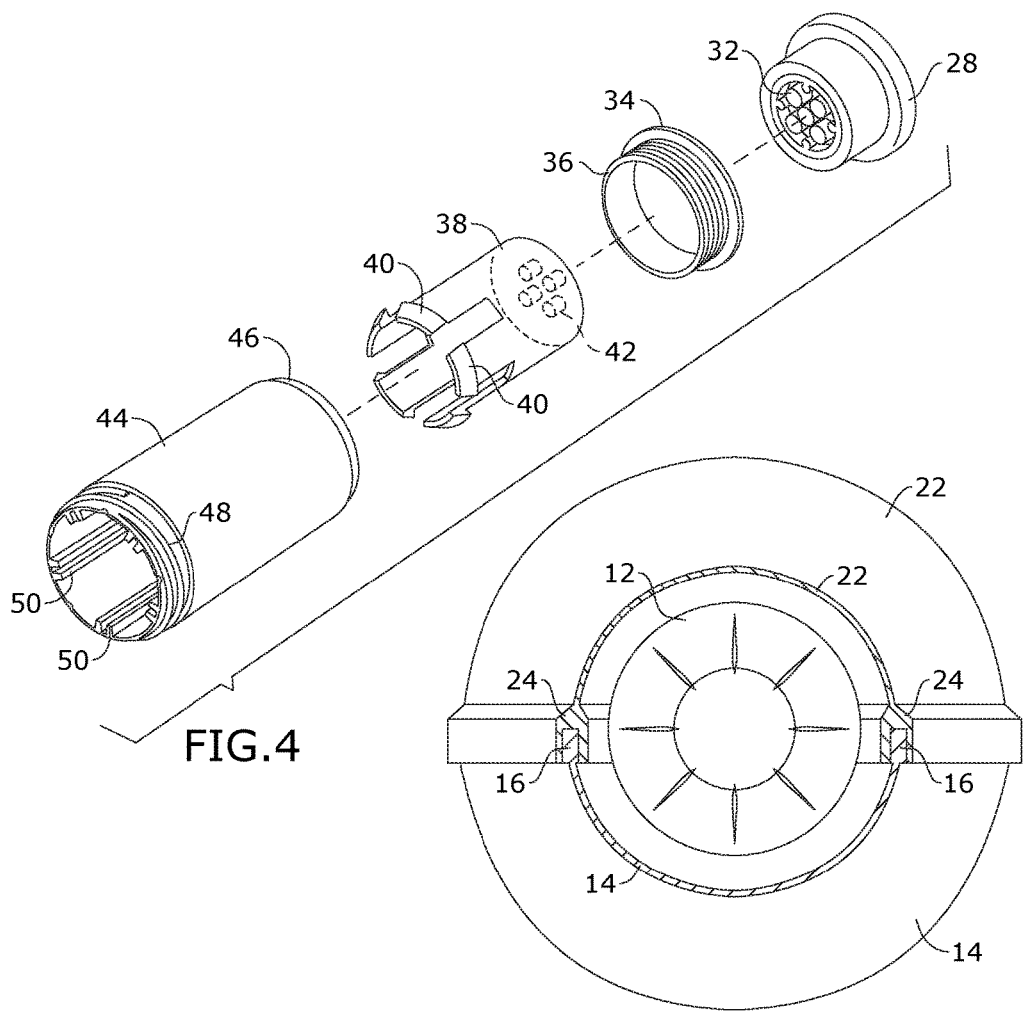
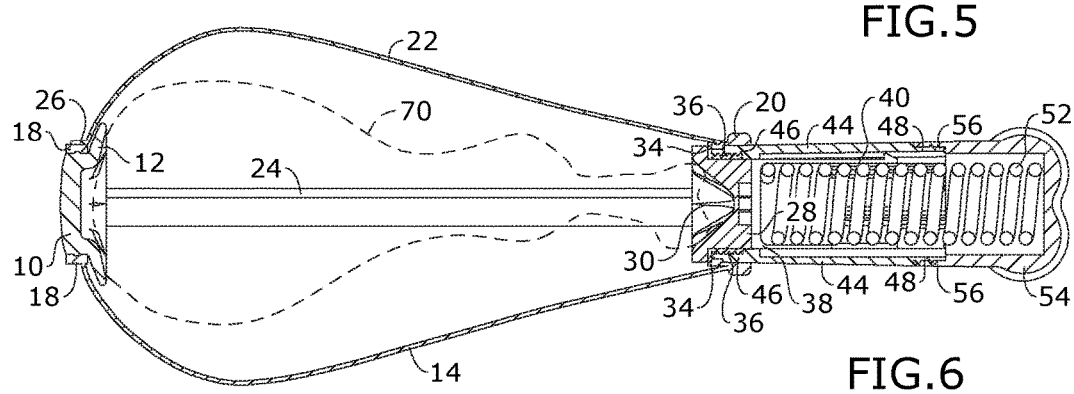

TURKEY LEG HOLDER

RELATED APPLICATION

This application claims priority to provisional patent application U.S. Ser. No. 62/141,468 filed on Apr. 1, 2015, the entire contents of which is herein incorporated by reference.

BACKGROUND

The embodiments herein relate generally to food accessories, and more particularly, to a turkey leg holder.

Turkey legs, such as those sold at rodeos and theme parks, generally come wrapped in aluminum foil and are messy to eat. Additionally, aluminum foil does not prevent a user from burning his or her hands when handling the turkey leg, nor does aluminum foil contain the grease. When a person does not finish the turkey legs, the options are to throw the remainder away or try to re-wrap the leg in the aluminum foil.

Therefore, what is needed is a device that provides safe and sanitary storage for the turkey leg, while simultaneously making the turkey leg easier to eat and preventing the user from getting burned.

SUMMARY

Some embodiments of the present disclosure include a turkey leg holder for storing a smoked turkey leg. The turkey leg holder may include an openable container having an interior configured to accommodate a turkey leg, the container having an upper panel attached to a lower panel; a pair of supports configured to secure the turkey leg within the container; and a rotation device attached to the supports, the rotation device providing for rotation of the supports and the turkey leg within the container.

BRIEF DESCRIPTION OF THE FIGURES

The detailed description of some embodiments of the invention is made below with reference to the accompanying figures, wherein like numerals represent corresponding parts of the figures.

FIG. 4 is a detail reverse exploded view of one embodiment of the present disclosure.

FIG. 5 is a section view of one embodiment of the present disclosure, taken along line 5-5 in FIG. 1.

FIG. 6 is a section view of one embodiment of the present disclosure, taken along line 6-6 in FIG. 1.

DETAILED DESCRIPTION OF CERTAIN EMBODIMENTS

Figure 1:
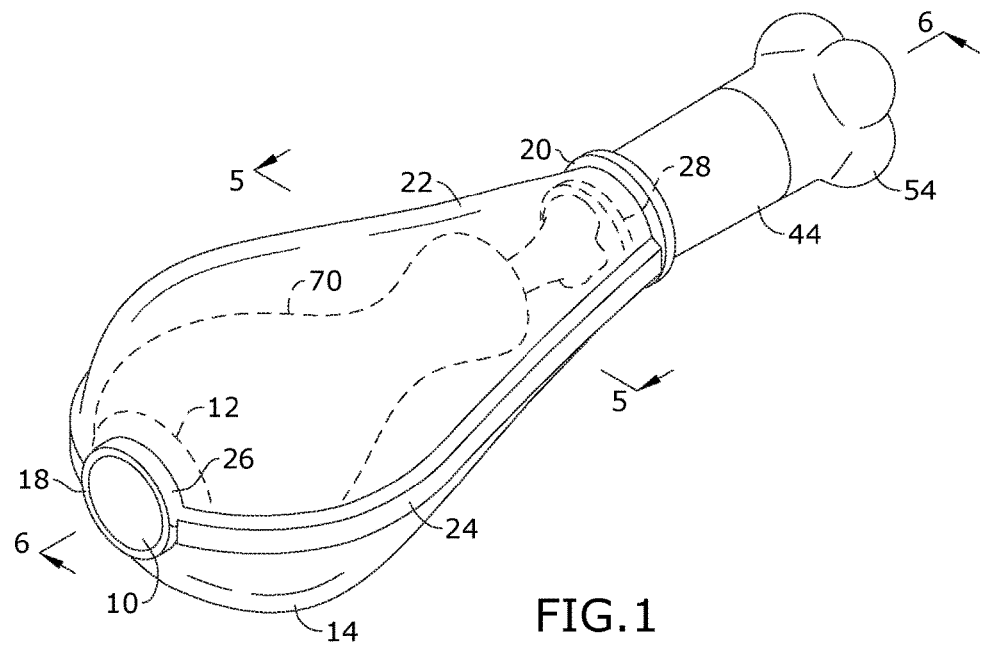
FIG. 1 is a perspective view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to hold a turkey leg and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Openable Container
2. Turkey Leg Supports
3. Rotation Mechanism

The various elements of the device of the present disclosure may be related in the following exemplary fashion. It is not intended to limit the scope or nature of the relationships between the various elements and the following examples are presented as illustrative examples only.

By way of example, and referring to FIGS. 1-10, some embodiments of the present disclosure include an openable storage container having an interior configured to accommodate a turkey leg, supports configured to support the turkey leg and secure it within the interior of the storage container, and a rotation device attached to the supports, the rotation device providing for rotation of the turkey leg to increase the ease with which a user may consume the turkey leg.

For example, as shown in FIGS. 1-3 and 5-8, the container may comprise an upper panel 22 removably attached to a lower panel 14, such that when the upper panel 22 is removed from the lower panel 16 and interior of the container configured to accommodate a turkey leg 70 is revealed. In embodiments, the upper panel 22 may snap or otherwise secure onto the lower panel 14. Thus, when a user is accessing a turkey leg 70 stored in the container, the upper panel 22 may be completely removed. For example, the upper panel 22 may comprise an upper lip 24 with a slot, and the lower panel 14 may comprise a lower lip 16, wherein the lower lip 16 is configured to fit snugly within the slot in the upper lip 24 such that the two panels snap together. To open the container, the upper panel 22 may simply be removed from the lower panel 14.

Figure 2:
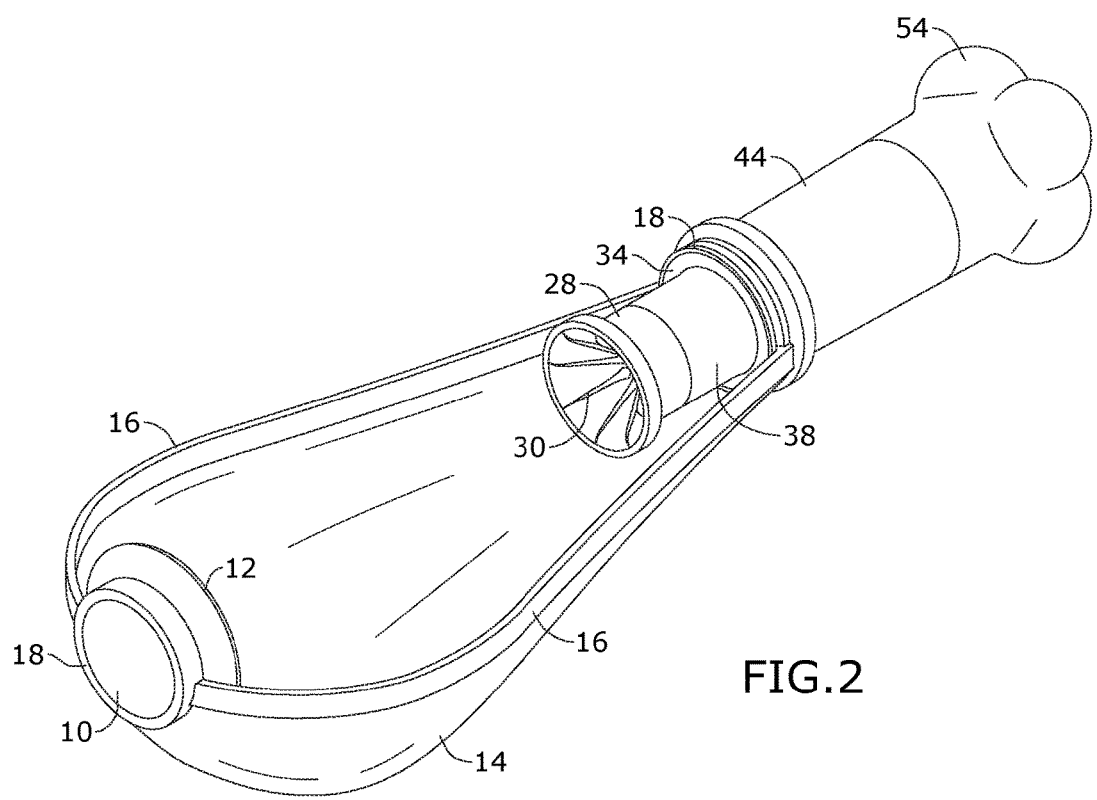
FIG. 2 is a perspective view of one embodiment of the present disclosure.
Figure 3:
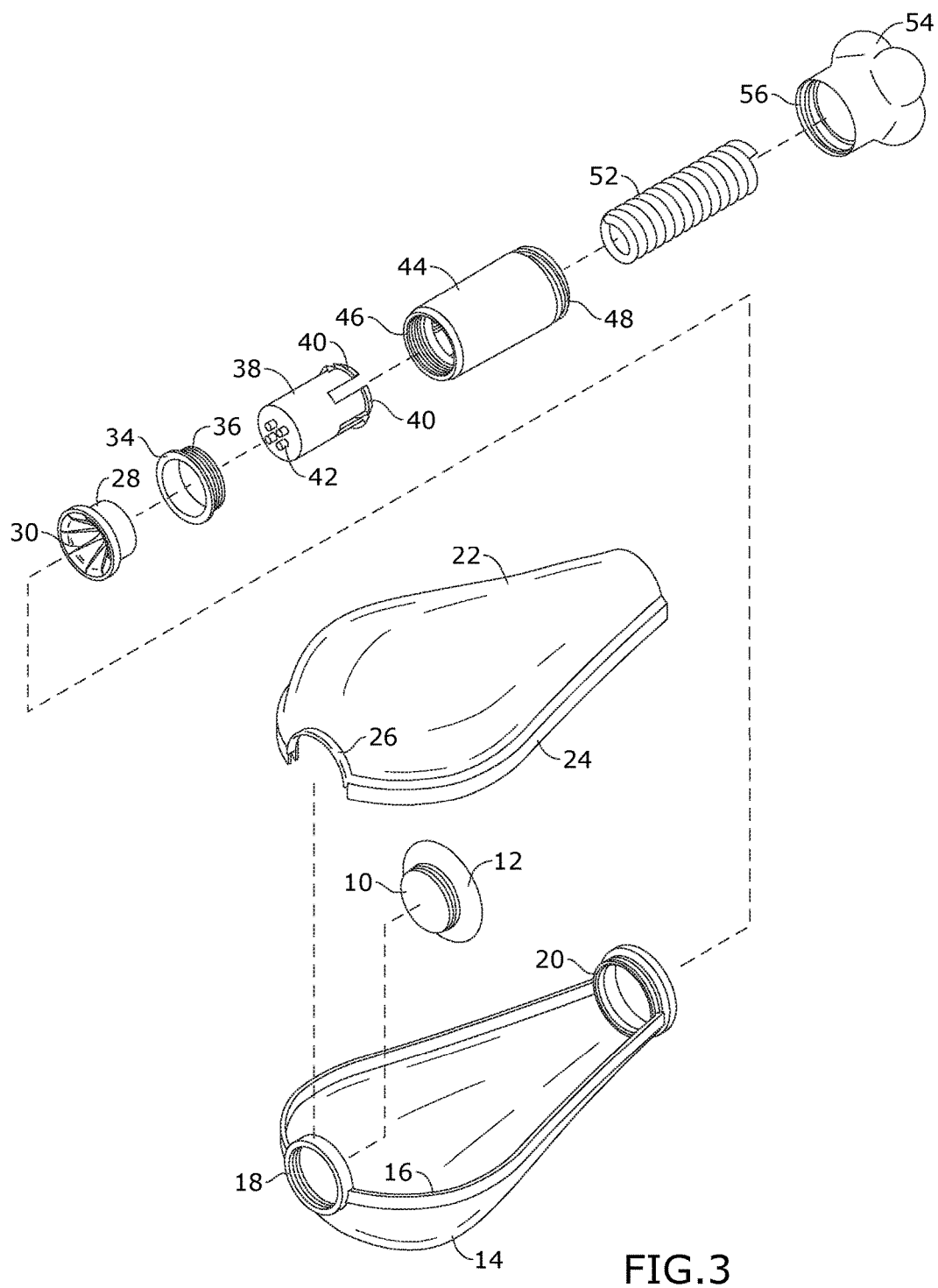
FIG. 3 is an exploded view of one embodiment of the present disclosure.

As shown in the Figures, a first grip configured to grip the bone extending from the meat of a turkey leg 70 may be positioned at a first end of the lower panel 14, and a second grip configured to grip the meatier end of the turkey leg 70 opposite the bone end may be positioned at a second end of the lower panel 14, wherein the second end is positioned distal from the first end, the pair of grips comprising the supports configured to secure the turkey leg 70 within the container. For example, the second grip may comprise an end holder grip 12, which may be positioned at the second end, as shown in FIGS. 1 and 2, wherein the end holder grip 12 is configured to be positioned against the meatier portion of the turkey leg 70. The end holder grip 12 may be attached to an end holder post 10 that is rotatably attached to the lower panel 14. In some embodiments, the end holder grip 12 is attached to the lower panel 14 by being secured within an end holder slot 18 in the lower panel 14. Thus, the end holder grip 12 and the end holder post 10 may be removed from the container by disengaging the end holder post 10 from the end holder slot 18. As shown in FIG. 3, the end holder post 10 and the internal surface of the end holder slot 18 may be threaded such that the end holder post 10 may screw into the end holder slot 18. Additionally, the upper panel 22 may comprise an upper panel slot 26 at a second end of the panel, the upper panel slot 26 configured to align with and accommodate the end holder slot 18. As shown in, for example FIG. 5, some embodiments of the end holder grip 12 may be substantially circular and slightly concave, as shown in FIG. 6, to accommodate the meatier end of the turkey leg 70.

Figure 7:
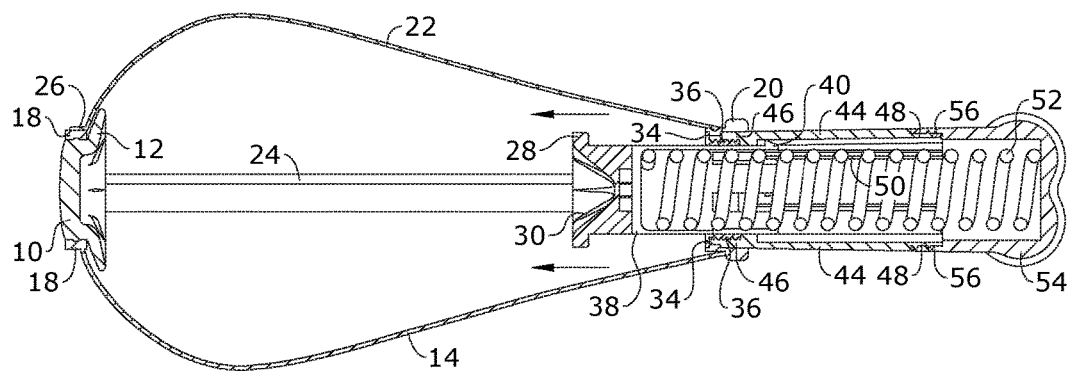
FIG. 7 is a section view of one embodiment of the present disclosure.

As described above, at a first end of the container may be positioned a grip configured to hold the bone portion of the turkey leg 70. In embodiments, the structure of the grip configured to hold the bone portion may be different than the grip configured to grip the meatier portion of the turkey leg 70. For example, as shown in FIGS. 1-4, the grip configured to hold the bone end of the turkey leg 70 may be a rotating grip 28 with grip ridges 30 on one surface thereof and rear rotator orifices 32 on an opposite surface thereof. The rotating grip 28 may extend through a stiffening ring 34 and engage with spring tube tabs 42 on a spring tube 38. The lower panel 14 may comprise a stiffening ring slot 20 configured to accommodate the stiffening ring 34. In embodiments, the spring tube tabs 42 may be configured to be accommodated within the rear rotator orifices 32, such that when the spring tube 38 rotates, the rotating grip 28 simultaneously rotates. The spring tube 38 may be positioned within a fixed tube 44. An end of the fixed tube proximate to the rotating grip 28 may comprise a female threaded internal surface 46, while an end of the stiffening ring 34 distal from the rotating grip 28 may comprise a male threaded external surface 36 configured to engage with the female threaded internal surface 46. An end of the spring tube 38 distal from the rotating grip 28 may comprise a plurality of spring tube prongs 40, as shown in FIG. 3. The spring tube prongs 40 may be configured to engage with guide ridges 50 on an internal surface of the fixed tube 44. An end of the fixed tube distal from the rotating grip 28 may comprise a male threaded post 48, which may screw into end cap 54, wherein the end cap 54 comprises a threaded opening 56. The fixed tube 44 and the end cap 54 may be substantially hollow such that spring 52 may be positioned therein, as shown in FIGS. 6 and 7. The spring 52 may put pressure on the spring tube 40, which in turn pushes the rotating grip 28 away from the end cap 58. When a turkey leg 70 is placed into the container, the rotating grip 28 may be pushed towards the end cap 58 by the bone end of the turkey leg 70. The tension from the spring 52 may put pressure on the bone end, securing the turkey leg 70 between the rotating grip 28 and the end holder grip 12.

Figure 8:
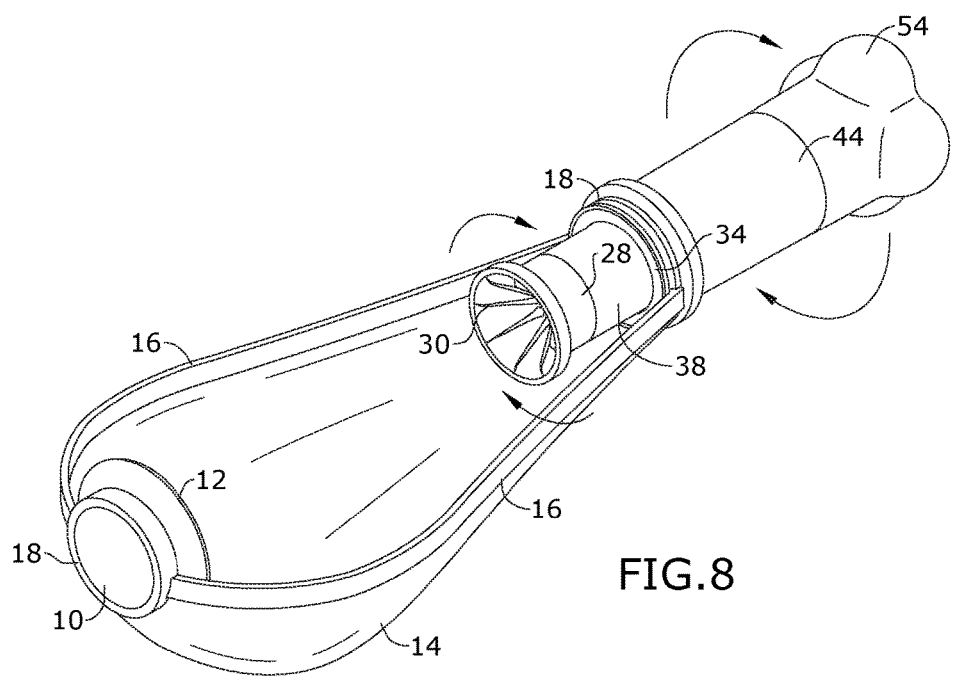
FIG. 8 is a perspective view of one embodiment of the present disclosure.

As shown in FIG. 8, the end cap 54, the fixed tube 44, the stiffening ring 34, the spring tube 28, and the rotating grip 28 may be configured to rotate clockwise and/or counter-clockwise. When a turkey leg 70 is positioned within the container and a user rotates the end cap 54, the turkey leg 70 may be caused to rotate as a result. Thus, a user is granted access to all surfaces and portions of the turkey leg 70.

Figure 9:
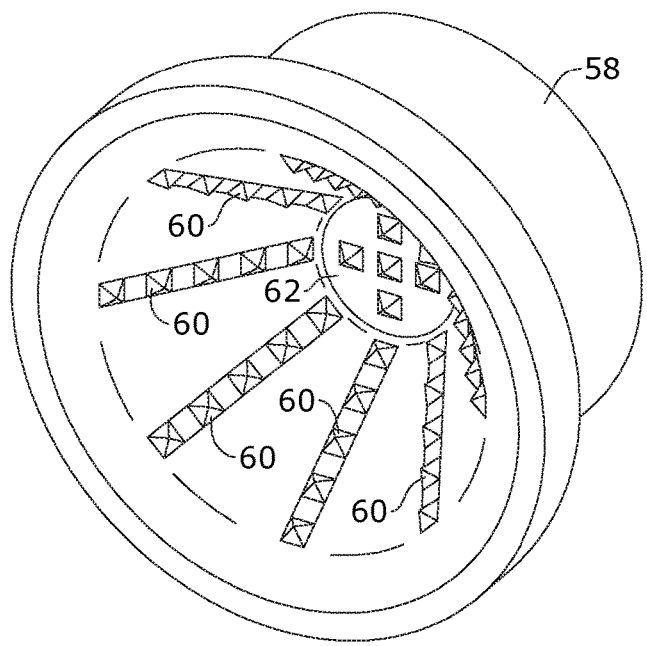
FIG. 9 is a perspective view of one embodiment of the present disclosure.
Figure 10:
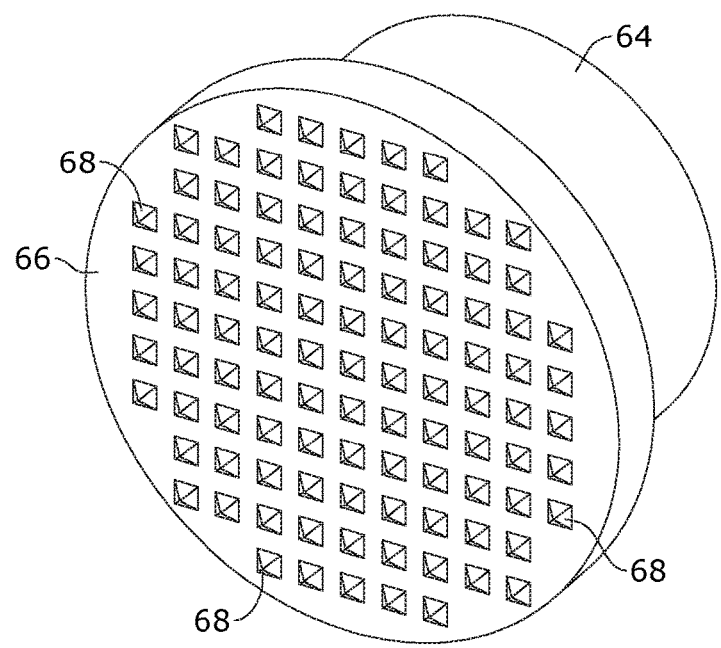
FIG. 10 is a perspective view of one embodiment of the present disclosure.

While the grip configured to hold the bone is described above as being rotating grip 28 with ridges 30 and a concave shape, other versions of the grip are envisioned. For example, as shown in FIG. 9, the grip may be rotating grip 58 with a concave/conical shape, wherein a plurality of toothed ridges 60 extend from an outer rim of the rotating grip 58 to an area proximate to a central portion of the grip 58, and the central portion of the grip 58 comprises a toothed disc 62. In yet a further embodiment, as shown in FIG. 10, the grip may be a rotating grip 64 with a planar gripping surface 66 comprising a plurality of teeth 68. Of course other versions of the grip are also envisioned.

In an alternate embodiment (not shown), the upper panel may be hingeably attached to the lower panel by a hinge, such that the panels are configured to open to reveal the interior of the container. In such embodiments, the upper panel may be secured to the lower panel using a locking mechanism. For example, the upper panel may comprise a slide lock slidably attached thereto, and the lower panel may comprise a slide lock mate extending therefrom, such that when the upper panel is aligned with the lower panel, the slide lock is configured to slide toward the lower panel and engage with the slide lock mate, securing the container in a closed configuration. To unlock the container, the slide lock may be simply slid away from the lower panel to disengage the slide lock and the slide lock mate.

In another alternate embodiment, instead of the pair of grips, an upper rotator cylinder sleeve may extend from a first end of the lower panel, and a lower rotator cylinder sleeve may extend from a second end of the lower panel, wherein the turkey leg may be positioned within the container such that the meatier portion of the turkey leg is positioned proximate to the upper rotator cylinder sleeve and the other end of the turkey leg with the bone extending from the meat is positioned proximate to the lower rotator cylinder sleeve. The upper rotator cylinder sleeve may be configured to accommodate an upper rotator, wherein a first end of the upper rotator may comprise a set of upper spikes and an opposite end of the upper rotator may comprise an upper rotator knob. The upper spikes may be configured to penetrate into the meat of the turkey leg to secure the turkey leg to the upper rotator. Thus, when a user rotates the upper rotator the turkey leg may also rotate.

Similar to the upper rotator cylinder sleeve described above, the alternate embodiment of the container may include a lower rotator sleeve configured to accommodate a lower rotator, wherein a first end of the lower rotator may comprise a set of lower gripping arms and an opposite end of the lower rotator may comprise a lower rotator knob. The lower gripping arms may be configured to clamp onto the bone of the turkey leg to secure the turkey leg to the lower rotator. The lower gripping arms may be slightly angled inward, each having a curved end. When a user rotates the lower rotator, the turkey leg may also rotate. Therefore, when a user rotates either the lower rotator or the upper rotator, the other rotator and the turkey leg may also rotate.

The device and its elements may be made of any suitable material and, in some embodiments, are made of metal and/or plastic. In some embodiments, the upper and lower panels may comprise a transparent plastic material, while in other embodiments, the panels may be opaque and made from a different material. As shown in the Figures, the device may be shaped similar to an elongated turkey leg have a length of, for example, about 11 inches.

To use the device of the present disclosure, a user may position a turkey leg in the interior of the container, centrally aligning the turkey leg. A user may close the upper panel to store the turkey leg. To eat the turkey leg, a user may remove or otherwise open the upper panel and eat the turkey leg as normal, holding the bottom panel rather than the turkey leg itself. Once the meat has been eaten off of a first area of the turkey leg, the user may rotate the turkey leg as described above. When the user is done eating, the user may close the top panel to store the turkey leg.

While the above embodiments of the present disclosure describe the container as holding a turkey leg, the container is not limited to this use. Rather, the container may be used to store other food items, such as corn on the cob.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A turkey leg holder for storing a smoked turkey leg, the turkey leg holder comprising:
   an openable container having an interior sized to accommodate a turkey leg, the container comprising an upper panel attached to a lower panel;
   a pair of supports configured to secure the turkey leg within the container, the pair of supports comprising:
   a first grip configured to grip a bone extending from meat of the turkey leg, the first grip being positioned at a first end of the lower panel, and
   a second grip configured to grip a meatier end of the turkey leg opposite the bone end, the second grip being positioned at a second end of the lower panel, the second grip being structurally different from the first grip; and
   a rotation device attached to the supports, the rotation device providing for rotation of the supports and the turkey leg within the container,
   wherein:
   the first grip comprises a rotating grip with a gripping surface and a plurality of rear rotator orifices on an opposite surface thereof;
   the rotating grip extends through a stiffening ring and engages with spring tube tabs on a spring tube, such that when the spring tube rotates, the rotating grip simultaneously rotates;
   the spring tube is positioned within a fixed tube;
   an end of the fixed tube proximate to the rotating grip is positioned to engage with the stiffening ring;
   an end of the fixed tube distal from the rotating grip is positioned to engage with an end cap; and
   a spring is positioned within the fixed tube and the end cap, the spring designed to put pressure on the spring tube, which in turn pushes the rotating grip away from the end cap.

2. The turkey leg holder of claim 1, wherein the upper panel is removably attached to the lower panel.

3. The turkey leg holder of claim 2, wherein:
   the upper panel comprises an upper lip with a slot;
   the lower panel comprises a lower lip; and
   the lower lip is configured to fit within the slot in the upper lip to secure the upper panel to the lower panel.

4. The turkey leg holder of claim 1, wherein:
   the second grip comprises an end holder grip configured to be positioned against the meatier portion of the turkey leg;
   the end holder grip is attached to an end holder post, which is rotatably attached to the lower panel; and
   the end holder grip is substantially circular and concave.

5. The turkey leg holder of claim 1, wherein the rotating grip is concave and comprises a plurality of grip ridges.

6. The turkey leg holder of claim 5, wherein the grip ridges are toothed grip ridges.

7. The turkey leg holder of claim 1, wherein the rotating grip is a planar grip with a plurality of teeth.

* * * * *